United States Patent
Vajapeyam

(10) Patent No.: US 9,405,691 B2
(45) Date of Patent: Aug. 2, 2016

(54) LOCATING CACHED DATA IN A MULTI-CORE PROCESSOR

(71) Applicant: EMPIRE TECHNOLOGY DEVELOPMENT LLC, Wilmington, DE (US)

(72) Inventor: Sriram Vajapeyam, Bangalore (IN)

(73) Assignee: Empire Technology Development LLC, Wilmington, DE (US)

( * ) Notice: Subject to any disclaimer, the term of this patent is extended or adjusted under 35 U.S.C. 154(b) by 61 days.

(21) Appl. No.: 14/369,913

(22) PCT Filed: Aug. 12, 2013

(86) PCT No.: PCT/US2013/054538
§ 371 (c)(1),
(2) Date: Jun. 30, 2014

(87) PCT Pub. No.: WO2014/204495
PCT Pub. Date: Dec. 24, 2014

(65) Prior Publication Data
US 2015/0242322 A1    Aug. 27, 2015

(30) Foreign Application Priority Data
Jun. 19, 2013    (IN) .......................... 2653/CHE/2013

(51) Int. Cl.
G06F 12/00    (2006.01)
G06F 12/08    (2016.01)
(Continued)

(52) U.S. Cl.
CPC ........ *G06F 12/0842* (2013.01); *G06F 11/3006* (2013.01); *G06F 11/3404* (2013.01);
(Continued)

(58) Field of Classification Search
CPC ............ G06F 12/0842; G06F 11/2006; G06F 11/3404; G06F 2212/62; G06F 11/3006
USPC .......................................................... 711/119
See application file for complete search history.

(56) References Cited

U.S. PATENT DOCUMENTS 5,282,274 A    1/1994    Liu
5,822,756 A    10/1998    Thome et al.
(Continued)

FOREIGN PATENT DOCUMENTS

JP    2012203698 A    10/2012

OTHER PUBLICATIONS

"Maximize multicore performance with content aware routing," accessed at http://www.eetimes.com/document.asp?doc_id=1272150, Apr. 27, 2009, pp. 1-4.
(Continued)

*Primary Examiner* — Mark Giardino, Jr.
(74) *Attorney, Agent, or Firm* — Moritt Hock & Hamroff LLP; Steven S. Rubin, Esq.

(57) ABSTRACT

Techniques described herein are generally related to managing cached memory addresses in a multi-core processor device that has a plurality of cores and a plurality of caches. Communication between the plurality of caches of and a main memory may be monitored. One or more memory addresses cached by the plurality of cores may be identified based on the monitored communications. A probabilistic memory address distribution table of the locations of the one or more memory addresses cached by the plurality of core may be generated and location of a given memory address can be predicted based upon the probabilistic memory address distribution table.

28 Claims, 6 Drawing Sheets

(51) Int. Cl.
*G06F 11/30* (2006.01)
*G06F 11/34* (2006.01)
*G06F 13/00* (2006.01)
*G06F 13/28* (2006.01)

(52) U.S. Cl.
CPC .......... *G06F12/084* (2013.01); *G06F 12/0811* (2013.01); *G06F 12/0862* (2013.01); *G06F 2212/6024* (2013.01); *G06F 2212/6026* (2013.01); *G06F 2212/62* (2013.01)

(56) References Cited

U.S. PATENT DOCUMENTS

| | | | |
|---|---|---|---|
| 7,369,557 B1* | 5/2008 | Sinha | H04L 45/38 370/392 |
| 7,581,064 B1 | 8/2009 | Zedlewski et al. | |
| 7,941,631 B2 | 5/2011 | Champagne et al. | |
| 8,856,456 B2* | 10/2014 | Hendry | G06F 12/0831 711/146 |
| 2006/0143384 A1 | 6/2006 | Hughes et al. | |
| 2008/0209133 A1* | 8/2008 | Ozer | G06F 12/0822 711/146 |
| 2009/0024835 A1 | 1/2009 | Fertig et al. | |
| 2010/0146249 A1 | 6/2010 | Burger et al. | |
| 2011/0153987 A1 | 6/2011 | Luke et al. | |
| 2011/0231593 A1 | 9/2011 | Yasufuku et al. | |
| 2012/0173819 A1 | 7/2012 | Solihini | |
| 2012/0246441 A1 | 9/2012 | Usui | |
| 2014/0032854 A1* | 1/2014 | Lih | G06F 12/0837 711/141 |
| 2014/0095806 A1* | 4/2014 | Fajardo | G06F 12/0831 711/146 |

OTHER PUBLICATIONS

"RdRand," Wikipedia, accessed at http://web.archive.org/web/20120207064506/http://en.wikipedia.org/wiki/RdRand, last modified on Jan. 5, 2012, pp. 1-3.

Boyd-Wickizer, S., and Khan, A., "Data Movement Control for the PowerPC Architecture," accessed at http://csg.csail.mit.edu/6.375/6_375_2011_www/handouts/other/group2_final.pdf, accessed on Jun. 12, 2014, pp. 1-6.

Cantin, J.F., et al., "Coarse-Grain Coherence Tracking: RegionScout and Region Coherence Arrays," IEEE Micro, 2006, pp. 70-79, vol. 26, Issue 1.

Ehikioya, S.A., et al., "Intelligent Content-Based Routing for Enhanced Internet Services," International Journal of the Computer, the Internet and Management, 2006, pp. 8-19, vol. 14, No. 1.

González, A., et al, "Eliminating Cache Conflict Misses Through XOR-Based Placement Functions," Proceedings of the 11th International Conference on Supercomputing, 1997, pp. 76-83.

Kamruzzaman, M., et al., "Inter-core Prefetching for Multicore Processors Using Migrating Helper Threads," Proceedings of the sixteenth international conference on Architectural support for programming languages and operating systems, 2011, pp. 393-404.

Kamruzzaman, M., et al., "Software Data-Spreading: Leveraging Distributed Caches to Improve Single Thread Performance," Proceedings of the 2010 ACM SIGPLAN conference on Programming language design and implementation, 2010, pp. 460-470.

Lenoski, D., et al, "The Directory-Based Cache Coherence Protocol for the DASH Multiprocessor," Proceedings of the 17th annual international symposium on Computer Architecture, 1990, pp. 148-159.

Moshovos, A., "RegionScout: Exploiting Coarse Grain Sharing in Snoop-Based Coherence," Proceedings of the International Symposium on Computer Architecture, 2005, pp. 234-245.

Moshovos, A., et al, "JETTY: Filtering Snoops for Reduced Energy Consumption in SMP," Proceedings of the 7th International Symposium on High-Performance Computer Architecture, 2001, pp. 12.

Rott, J., "Download the Latest Intel® Digital Random Number Generator Software Implementation Guide," Intel, accessed at http://web.archive.org/web/20130615035424/http://software.intel.com/en-us/articles/download-the-latest-bull-mountain-software-implementation-guide/?, Jul. 23, 2012, pp. 1-3.

Saavedra, R.H., et al., "Micro Benchmark Analysis of the KSR1," USC-CS-93-538, Department of Computer Science, University of Southern California, 1993, pp. 12.

Tambat, S., and Vajapeyam, S., "Page-Level Behavior of Cache Contention," IEEE Computer Architecture Letters, 2002, pp. 9, vol. 1, Issue 1.

Topham, N., and Gonzalez, A., "Randomized Cache Placement for Eliminating Conflicts," IEEE Transactions on Computers, 1999, pp. 185-192, vol. 48, Issue 2.

International Search Report and Written Opinion for International Application No. PCT/US2013/054538 issued on Mar. 31, 2014, 10 pages.

\* cited by examiner

| BIT PATTERN | CORE IDENTIFICATION NUMBER |
|---|---|
| 00.0X010XXX | 7 |
| 00.0X10110X1XXX | 5 |
| 00.0X10110X0XXX | 4 |

FIG. 3

| BIT PATTERN | CORE IDENTIFICATION NUMBER | PROBAB/ PERCENTAGE |
|---|---|---|
| 000X0010 | 4 | 80% |
| 000X0110 | 2 | 12% |

FIG. 4

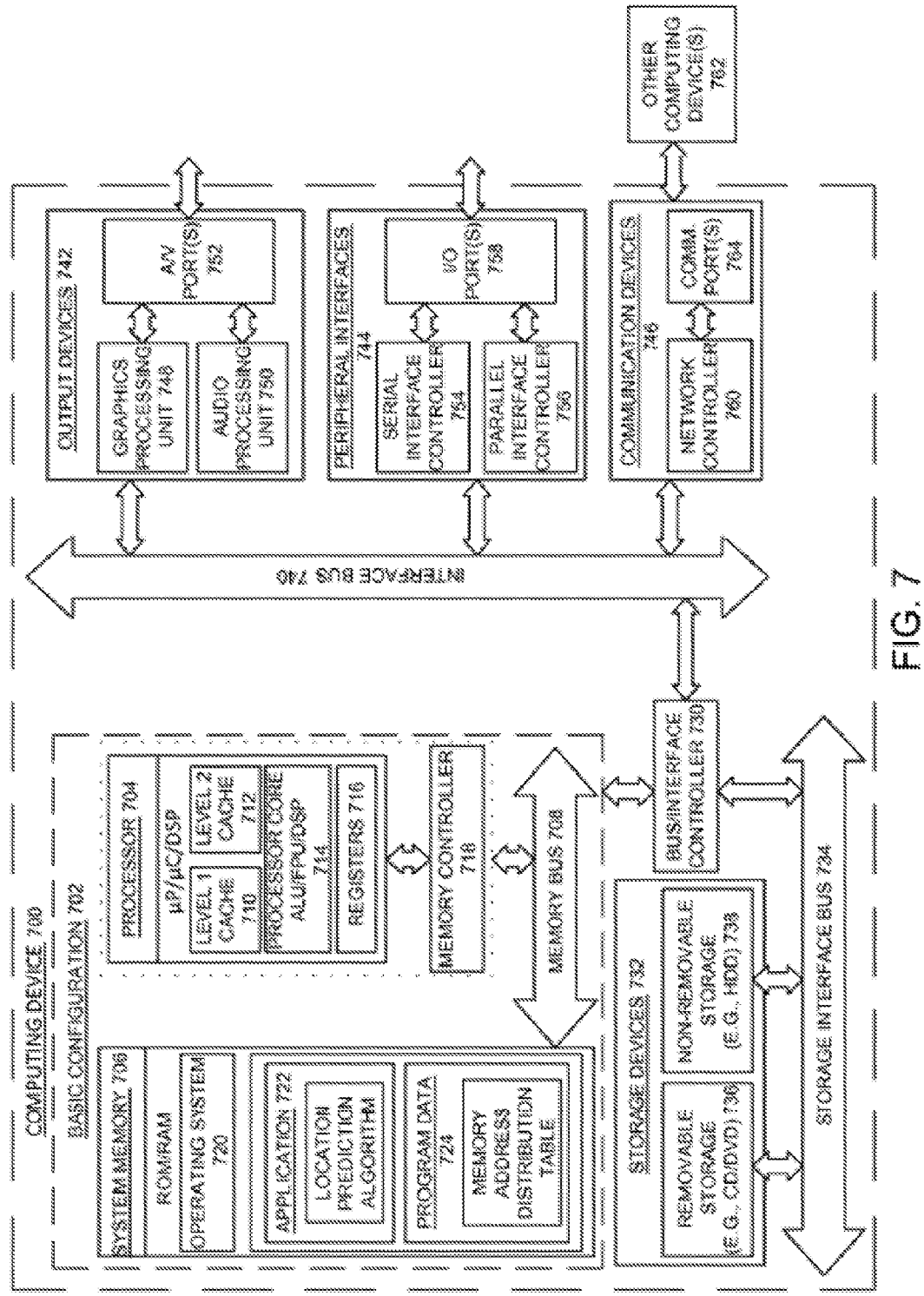

LOCATING CACHED DATA IN A MULTI-CORE PROCESSOR

CROSS REFERENCE TO RELATED APPLICATIONS

This application is a U.S. National Stage filing under 35 U.S.C. §371 of International Application No. PCT/US13/54538 filed on Aug. 12, 2013, where the International Application claims priority under 35 U.S.C. §119(a) to Indian Patent Application No. 2653/CHE/2013 filed Jun. 19, 2013. The disclosures of the International Application and the Indian Patent Application are hereby incorporated by reference in their entirety.

BACKGROUND

Unless otherwise indicated herein, the approaches described in this section are not prior art to the claims in this application and are not admitted to be prior art by inclusion in this section.

Many modern computing systems utilize multi-core processors having two or more cores interfaced for enhanced performance and efficient processing of multiple tasks and threads. Data required for execution of single and multiple thread applications may be stored across caches of multiple cores of the multi-core processors, where the cores used for storing data may be different from those cores used for executing the single or multiple threads. During operation, such data may be accessed from the cached locations across multiple cores and the cached locations of memory addresses may need to be determined.

Cache coherence protocols implemented for multi-core processors may incorporate functionalities to determine cached locations of the memory addresses. For example, centralized directories may be utilized to determine cached location of a given memory address. In certain multi-core processors, distributed directories may be implemented where look-up requests for one or more memory addresses may be sent to the directories and subsequently the directories are searched for the memory addresses. In other multi-core processors, core level directories may be utilized for determination of location of certain memory addresses.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

Techniques described herein are generally related to managing cached memory addresses in a multi-core processor. The various described techniques may be applied to methods, systems, devices or combinations thereof.

According to some examples of the present disclosure, various methods related to managing cached memory addresses in a multi-core processor device are described. Some example methods may include monitoring communication between one or more of a plurality of caches of a plurality of cores of a multi-core processor device and a main memory. One or more memory addresses cached by each of the plurality of cores may be identified based on the monitored communications. A probabilistic memory address distribution table of the locations of the one or more memory addresses cached by the plurality of cores may be generated and the location of a given memory address can be predicted based upon the probabilistic memory address distribution table.

According to additional examples of the present disclosure, additional methods related to managing cached memory addresses in a multi-core processor device are described. Some example methods may include generating a probabilistic memory address distribution table of one or more memory addresses cached by one or more of a plurality of cores of the multi-core processor device. One or more threads may be executed on a first core of the plurality of cores of the multi-core processor device. A memory address to be accessed during execution of the one or more threads on an on-chip cache of the first core may be identified. A location of the identified memory address may be predicted on one or more on-chip caches of other cores of the multi-core processor device based upon the generated probabilistic memory address distribution table. Data associated with the identified memory address may subsequently be accessed from the predicted location.

According to still further examples of the present disclosure, multi-core processor devices are described. Some described multi-core processor devices may include a plurality of cores. Each of the cores may be associated with one or more on-chip caches, where one or more of the cores may include a location prediction module. The multi-core processor device may include a memory address summarizer configured to monitor communication between the one or more on-chip caches and a main memory to generate a probabilistic memory address distribution table. The probabilistic memory address distribution table may be generated by the memory address summarizer using a plurality of memory addresses cached in the one or more on-chip caches of the plurality of cores. Each of the location prediction modules can be configured to predict a location of a given memory address based upon the probabilistic memory address distribution table.

According to additional examples of the present disclosure, additional multi-core processor devices are described. Some example multi-core processor devices may include a plurality of cores. Each of the cores may be associated with one or more on-chip caches. The multi-core processor devices may include a plurality of routers configured to facilitate communications between the plurality of cores. Each of the plurality of routers may include a probabilistic memory address distribution table of memory addresses stored by the plurality of on-chip caches of one or more of the cores coupled to output connection paths of the corresponding router. The probabilistic memory address distribution table may be utilized to predict a location of a given memory address based upon the stored memory address distribution.

BRIEF DESCRIPTION OF THE FIGURES

In the drawings:

FIG. 3 illustrates an example probabilistic memory address distribution table generated by the memory address summarizer of the multi-core processor device of FIG. 2;

FIG. 4 illustrates another example probabilistic memory address distribution table generated by the memory address summarizer of the multi-core processor device of FIG. 2;

FIG. 7 is a block diagram illustrating an example computing device that is arranged for managing cached memory addresses in a multi-core processor, all arranged in accordance with at least some embodiments of the present disclosure.

DETAILED DESCRIPTION

Figure 1:
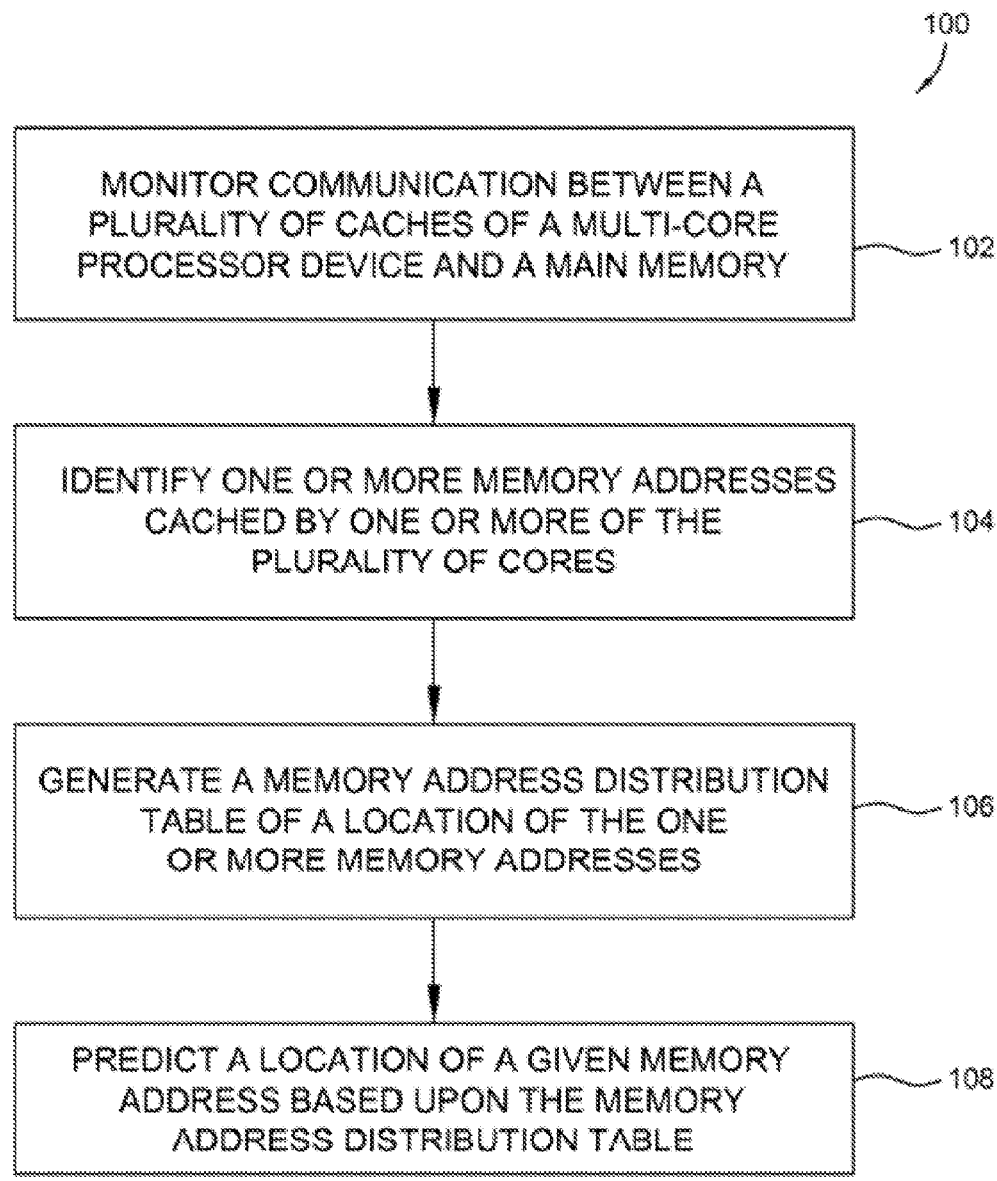
FIG. 1 is an illustration of a process for managing cached memory addresses in a multi-core processor device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments of the present disclosure are generally directed to techniques for managing cached memory addresses in a multi-core processor device. The multi-core processor device may include a plurality of cores and each of the cores may include one or more on-chip caches that may be arranged in close physical proximity to the respective core. Memory locations can be cached in the one or more on-chip caches. In the described embodiments, probabilistic techniques can be utilized to locate on-chip locations of a given memory address using the memory addresses of the memory locations to be accessed. The prediction of cache locations of memory addresses using the probabilistic techniques described below may incur substantially less look-up time to locate a memory address. The described techniques may be scalable for multi-core processor devices having a large number of cores (e.g., 1000 or more cores).

FIG. 1 is an illustration of an example process 100 for managing cached memory addresses in a multi-core processor device that is arranged in accordance with at least some embodiments described herein. Process 100 may include one or more operations, functions or actions as illustrated by one or more of blocks 102-108. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 100 may begin at block 102.

At block 102, "MONITOR COMMUNICATION BETWEEN A PLURALITY OF CACHES OF A MULTI-CORE PROCESSOR DEVICE AND A MAIN MEMORY", messages transferred between a plurality of caches of a plurality of cores of a multi-core processor device and a main memory can be monitored and analyzed. Each of the cores may be associated with one or more on-chip caches such as a level 1 (L1) cache and/or a level 2 (L2) cache. In addition, there may be other on-chip caches such as a shared cache that may be accessible by two or more of the plurality of cores. In some examples, data utilized by one core during execution of one or more threads may be cached in the caches of the other cores of the multi-core processor device. Moreover, the data may also be cached in shared caches between two or more of the cores. In one embodiment, each cache entry in the plurality of caches of the plurality of cores can include a cached copy of at least a portion of data cached in the main memory.

Communication between each of the on-chip caches and the main memory may be monitored by a memory address summarizer of the multi-core processor device. In one example, the multi-core processor device may include an additional processing core that can be configured to execute a thread, which may dynamically summarize the distribution of on-chip locations of cached data by monitoring addresses of the requesting processing cores and the fetched data from the shared cache and/or the main memory. In other examples, one or more of the processing cores of the multi-core processor device may be configured to function as the memory address summarizer.

In one example, communication between an on-chip cache such as the L1 cache or the L2 cache of cores and the shared cache may be monitored. In another example, communication between the shared cache and the main memory may be monitored. In yet another example, communication between the on-chip cache such as the L1 cache or the L2 cache and the main memory may be monitored. In another example, communication between the on-chip cache (e.g., L2 caches) of two or more cores may be monitored. Such communication may be carried over a communication bus or an interconnection network. In certain examples, memory addresses of cores requesting data from the on-chip cache, the shared cache and the main memory and the fetched data from the on-chip cache, the shared cache and the main memory may be monitored.

Processing may continue from block 102 to block 104, "IDENTIFY ONE OR MORE MEMORY ADDRESSES CACHED BY ONE OR MORE OF THE PLURALITY OF CORES." At block 104, one or more memory addresses cached by one or more of the plurality of cores are identified by the memory address summarizer of the multi-core processor device based upon the monitored communication. In some examples, messages transferred between the cores or the on-chip caches and the main memory may be analyzed to identify one or more memory addresses cached by the respective cores.

Processing may continue from block 104 to block 106, "GENERATE A MEMORY ADDRESS DISTRIBUTION TABLE OF A LOCATION OF THE ONE OR MORE MEMORY ADDRESSES". At block 106, a memory address distribution table of a location of the one or more memory addresses cached by each of the plurality of cores may be generated by the memory address summarizer. During operation, one or more threads may be executed on each of the cores of the multi-core processor device. During such execution, one or more memory addresses may be identified by the memory address summarizer. Further, core/cache identification numbers of respective cores requesting cached data may be monitored by analyzing such requests. Such core/cache identification numbers may be utilized by the memory address summarizer to build the memory address distribution table as data is fetched from one or more caches and/or from the main memory during execution of the one or more threads on the multi-core processor. The details of the memory address distribution table will be described below with reference to FIG. 4. In some examples, an additional core can be utilized to monitor addresses of the requesting cores and the fetched data from the shared cache and/or the main memory to generate the memory address distribution table. In other examples, one or more of the cores of the multi-core processor device may be configured to build the memory address distribution table.

In some examples, the memory address distribution table can include a probabilistic distribution table generated using the location of the one or more memory addresses cached by each of the plurality of cores. In certain example embodiments, the identified one or more memory addresses may be analyzed to identify a bit pattern of the memory addresses and the identified bit pattern may be utilized to generate the memory address distribution table. However, other techniques of generating the memory address distribution table may be envisaged. The memory address distribution table may be stored on the memory address summarizer. In some examples, the memory address distribution table may be communicated (e.g., periodically transmitted) to one or more cores of the multi-core processor device, where each of the cores may include a respective location prediction module. The location prediction module can be configured to store the memory address distribution table, and also configured to predict a location of a given memory address based upon the stored memory address distribution table.

Processing may continue from block 106 to block 108, "PREDICT A LOCATION OF A GIVEN MEMORY ADDRESS BASED UPON THE MEMORY ADDRESS DISTRIBUTION TABLE". At block 108, a location of a given memory address (e.g., a memory address to be accessed during execution of one or more threads on a core of the multi-core processor device) may be predicted using the memory address distribution table. In some examples, each of the cores of the multi-core processor device may include a location prediction module that is configured (e.g., via hardware logic or software executed instructions) to compare the given memory address with the memory address distribution table (e.g., a probability distribution table) and to identify one or more on-chip caches that may include the identified memory address.

The memory address distribution table can be generated using a variety of other techniques. In some example embodiments, data routed through a plurality of routers (e.g., routers associated with one or more cores) may be monitored to generate the memory address distribution table. Each router may maintain a memory address distribution table, where the table includes data that indicates the memory addresses stored by the on-chip caches of one or more of the cores coupled to output connection paths of the corresponding router. In some examples, the memory address distribution table can include a list of memory addresses of memory addresses stored by the plurality of on-chip caches of one or more of the cores that are physically connected to connection the corresponding router. Such memory address distribution table may be dynamically updated by the corresponding router and can be utilized to predict a location of any given memory address.

Figure 2:
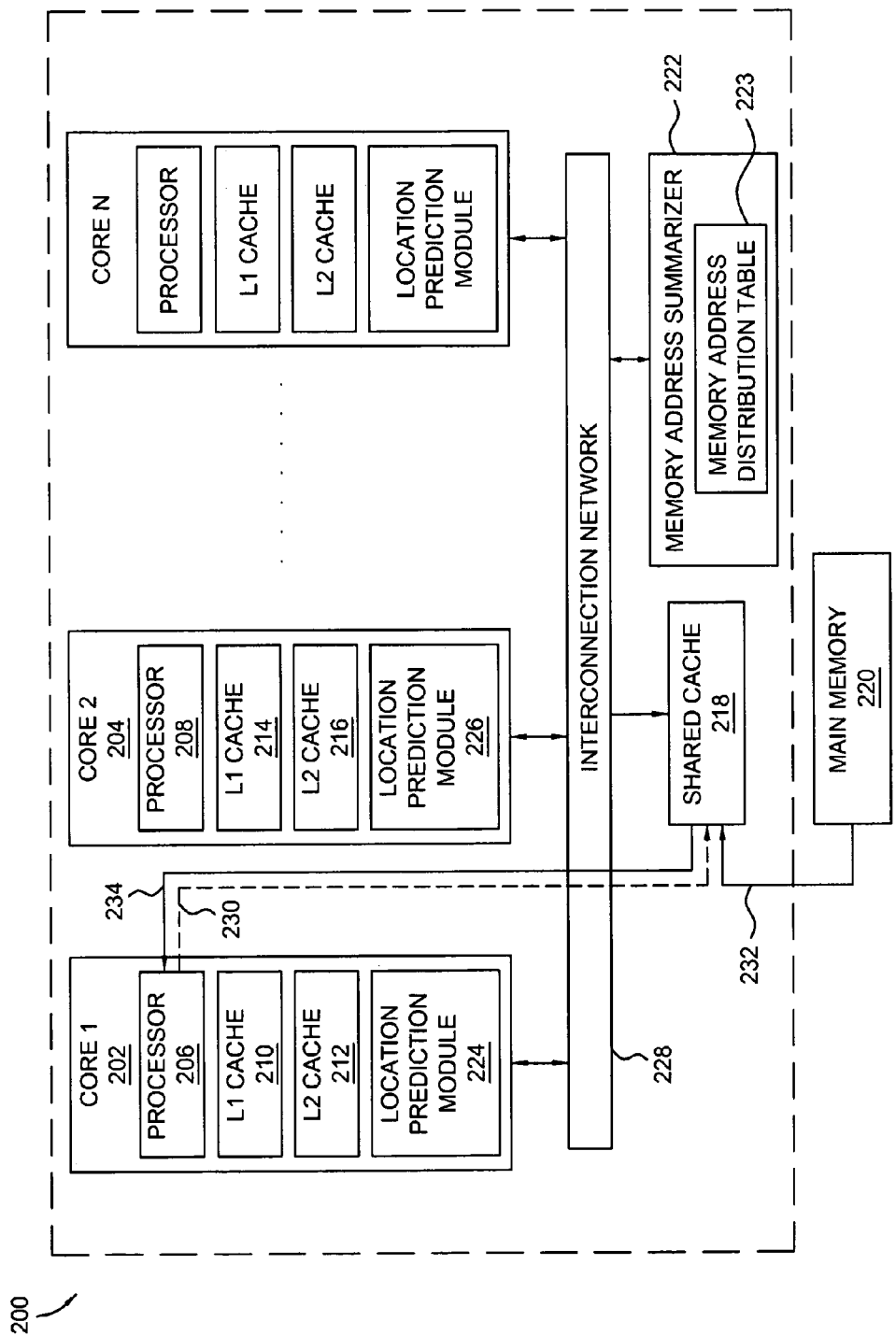
FIG. 2 is a schematic diagram illustrating functional components of an example multi-core processor device.

FIG. 2 is a schematic diagram illustrating functional components of an example multi-core processor device 200 arranged in accordance with at least some embodiments of the present disclosure. The multi-core processor device 200 may be a general-purpose processor, a special-purpose processor, an application specific processor, an embedded processor, a graphics processor, or the like. The multi-core processor device 200 may include a plurality of cores such as a first core 202 and a second core 204. The number (N) of the cores may be any number greater than one. Each of the cores (such as the first core 202 and the second core 204) includes internal functional blocks.

In some embodiments, the first core 202 may include a processor 206 and the second core 204 may include a processor 208. Moreover, each of the cores may be associated with one or more on-chip caches. For example, the first core 102 may include a level 1 (L1) cache 210 and a level 2 (L2) cache 212. Similarly, the second core 204 may include a level 1 (L1) cache 214 and a level 2 (L2) cache 216. In addition, the first core 202 and the second core 204 may be associated with a shared cache 218. It should be noted that the above arrangement of the components is purely illustrative and a varieties of other arrangements and components may be envisaged. The present technique may be applicable to a variety of multi-core processors with different configurations of local and shared caches to store data. For example, at least two cores may be associated with a shared on-chip cache selected from the plurality of on-chip caches of the multi-core processor device 200. In some examples, additional cache levels may be provided such as an L3 cache. In some examples, a single L1 cache may be provided in each core.

In some embodiments, data accessed during execution of single or multi-threaded applications by the multi-core processor device 200 can be located across the on-chip caches (such as the L1 cache 210 and L2 cache 212 of the first processor 202 and the L1 cache 214 and the L2 cache 216 of the second processor 204) and the shared cache 218 of the multi-core processor device 200. Moreover, a copy of such data can also be stored in a main memory 220. Such data may be accessible (e.g., for read or write access) to the cores (such as the first core 202 and the second core 204) while executing machine instructions. In some embodiments, the main memory 220 can include an off-chip cache.

The multi-core processor device 200 may also include a memory address summarizer 222 configured to monitor communication between the one or more on-chip caches (e.g., the L2 cache 212 of the first processor 202 or the L2 cache 216 of the second processor 204) and the main memory 220, and also configured to generate a memory address distribution table 223 that can be utilized to predict a location of a given memory address. In one embodiment, the memory address summarizer 222 can be configured to monitor communications between the on-chip caches of one or more processors (e.g., the L1 cache 210 and the L2 cache 212 of the first processor 202), and also configured to generate the memory address distribution table 223 based on the monitored communications. In another embodiment, the memory address summarizer 222 can be configured to monitor communication between the shared cache 218 and the main memory 220, and also configured to generate the memory address distribution table 223 based on the monitored communications. In certain embodiments, different combinations and/or subsets of the techniques described above may be utilized to generate the memory address distribution table 223.

The memory address summarizer 222 may be configured to generate the memory address distribution table 223 using a location of plurality of memory addresses cached in the one or more on-chip caches (e.g., the L1 cache 210, L2 cache 212, L1 cache 214, L2 cache 216) of the plurality of cores (such as the first core 202 and the second core 204) based upon the monitored communications. In some example embodiments, the memory address summarizer 222 may include an additional core that can be configured to execute a thread, which may dynamically summarize the distribution of on-chip locations of cached data by monitoring addresses of the requesting cores and the fetched data from the shared cache 218 and/or the main memory 220. In some examples, one or more of the cores of the multi-core processor device 200 may be configured to function as the memory address summarizer 222. In some other examples, additional hardware logic (such as used in cache coherence protocols) may be included to function as the memory address summarizer 222. In one example, the multi-core processor device 200 may include an off-chip core or a field-programmable gate array (FPGA) that can be configured to generate the memory address distribution table 223.

The memory address summarizer 222 can be configured to communicate (e.g., periodically transmit, on demand, etc.) the generated memory address distribution table 223 to a location prediction module, where each of the cores may include a respective location prediction module. For example, the memory address distribution table 223 from the memory address summarizer 222 can be transmitted over a communication bus (e.g., interconnection network 228) to a location prediction module 224 of the first core 202 and a location prediction module 226 of the core 204. The location prediction modules 224 and 226 can be configured to store the memory address distribution table 223, and also configured to predict a location of a given memory address based upon the stored memory address distribution table 223. In some embodiments, the memory address summarizer 222 can transmit the memory address distribution table 223 to the location prediction modules such as 224 and 226 in accordance with a pre-determined schedule. In, some examples, each of the location prediction modules such as 224 and 226 may include a subset of the memory address distribution table 223. The subset of the memory address distribution table 223 may be selected based upon data accessed by the threads executing on the processor core with which the respective location prediction module is associated.

In some example embodiments, one or more threads may be executed on the first core 202 of the multi-core processor device 200, and a memory address, to be accessed during execution of the one or more threads on the first core 202 may be identified. The memory address summarizer 222 may monitor the core identification number of the core (such as the first core 202) or identification numbers of caches requesting for cached data by analyzing such memory access requests (generally represented by reference numeral 230) from the respective core to another cache such as the shared cache 218. In some embodiments, the shared cache 218 may in-turn fetch the data from the main memory 220 (generally represented by reference numeral 232) and communicate the fetched data to the requesting core 202 (generally represented by reference numeral 234). Similarly, the core identification number of other cores (such as the second core 204) requesting for cached data may be utilized to build the memory address distribution as data is fetched from one or more caches, or from the main memory 220.

The memory address summarizer 222 can be configured to analyze such messages transferred from the main memory 220 to the cores (such as the first core 202) or one or more on-chip caches such as L2 cache 212 to monitor the core identification numbers of the requesting cores and the cached data. In various examples, the memory address distribution table 223 may include a probability distribution table. In some examples, the memory address summarizer 222 can be configured to analyze a bit pattern of each of the memory addresses to build the probability distribution table. However, other techniques may be used to generate the memory address distribution table 223 from the memory addresses of the cached data.

The location prediction modules 224 and 226 of the first core 202 and the second core 204 respectively may utilize the memory address distribution table 223 to predict the location of a given memory address, such as a memory address requested during execution of a thread. The location prediction modules 224 and 226 can be configured to compare the identified memory address with the memory address distribution table 223 (e.g., a probability distribution table) and to identify one or more cores that may cache the memory address in associated caches. Such one or more on-chip caches may be identified as predicted locations of the identified memory address.

In various example embodiments, two or more on-chip caches may be identified as the predicted locations of the memory address and a probability of occurrence of the memory address in each predicted location may also be estimated. In various embodiments, as a memory access request is generated during execution of one or more threads on a core, the required memory address is presented to the location prediction module of the respective core. As a result, in case of a local cache miss, a predicted location that may contain the memory address may be accessed.

As described above, the memory address summarizer 222 can generate the memory address distribution table 223 by monitoring communication between the plurality of on-chip caches (such as between L1 and L2 caches 210 and 212 of the first core 202 or between L1 and L2 caches 214 and 216) of the multi-core processor device 200. Similarly, the communication between the on-chip cache (such as L2 cache 212 of the first core 202) and the shared cache 218 may be monitored. Moreover, communication between the shared cache 218 and the main memory 220 may be monitored and utilized to generate the memory address distribution table 223.

The memory address distribution table 223 may be dynamically updated and may be periodically transmitted to location prediction modules (such as 224 and 226) of each core (such as the first core 202 and the second core 204) such that an updated distribution 223 is available to the respective location prediction module for prediction of location of any given memory address.

FIG. 3 illustrates an example memory address distribution table 300, arranged in accordance with at least some embodiments described herein. The memory address summarizer 222 can include a core (or controller, or logic, etc.) configured to execute a distribution summarizer process, effective to generate the memory address distribution table 300. The distribution summarizer thread can be a simple thread that can identify basic patterns for mapping the memory addresses to one or more cores and associated caches. However, a variety of other techniques may be utilized by the memory address summarizer 222 to generate the memory address distribution table 300. In other examples, the memory address summarizer 22 can include hardware logic effective to generate the memory address distribution table 300. In some examples, the memory address distribution table 300 can indicate a mapping between bit patterns 302 of memory addresses and core identification numbers 304 for predicted locations of the respective memory addresses.

In one example, memory address distribution table 300 shows that a given memory address has a bit pattern "00.0X010XXX", such as represented by reference numeral 306 that is likely to be present in core number 7 (represented by entry 308). Similarly, if a given memory address has a bit pattern "00.0X10110XXX" such as represented by reference numeral 310, it is likely to be present in core number 5 (represented by entry 312) of the multi-core processor device 200. The memory address distribution table 300 can include a number of such bit patterns and corresponding predicted core locations. The location prediction modules, such as modules 224 and 226, of cores such as the first core 202 and the second core 204 of the multi-core processor device 200 may look-up such memory address distribution table 300 to predict the location of the given memory address and access the data associated with the memory address from the predicted location.

FIG. 4 illustrates another example memory address distribution table 400, arranged in accordance with at least some embodiments described herein. The memory address distribution table 400 can include the mapping between bit patterns 402 of memory addresses, core identification numbers 404 for predicted locations of the respective memory addresses and a probability of occurrence 406 of the given memory address in the one or more caches associated with the one or more identified cores.

For example, if a given memory address has a bit pattern "000X0010" such as represented by reference numeral 408, it is likely to be present in core number 4 (represented by entry 410) of the multi-core processor and a probability of occurrence of the bit pattern in the core number 4 is about 80% (represented by entry 412). Similarly, if a given memory address has a bit pattern "000X0110" such as represented by reference numeral 414, it is likely to be present in core number 2 (represented by entry 416) of the multi-core processor device and a probability of occurrence of the bit pattern in the core number 4 is about 12% (represented by entry 418). The location prediction modules (such as represented by reference numerals 224 and 226) of cores (such as the first core 202 and the second core 204) of the multi-core processor device 200 may utilize such probabilistic distribution to determine the probable location of a given memory address.

As an example, if the bit pattern 408 includes a 32-bit address that has the address-bit-18 set to 0 it may be mapped to core identification number 4 where about 80% of the stored addresses have the address-bit-18 set to be 0. Similarly, about 12% of the addresses stored in core 2 may have the address-bit-18 set to be 0. When a particular core (say core 0) requires the location of a particular memory address with the address-bit-18 being 0, the corresponding location prediction module utilizes the probabilistic distribution described above and may look for the memory address in core 4 and core 2. In some examples, a probabilistic distribution may be generated for each of the 32 bits of the memory address and may be utilized to determine a location of the memory address.

The location prediction modules (such as represented by reference numerals 224 and 226) of the cores (such as the first core 202 and the second core 204) of the multi-core processor device 200 may utilize the memory address distribution table 223 generated by the memory address summarizer 222 to predict the location of the given memory address. In some example embodiments, the location prediction modules may use logical operations such as shift operations, masking operations and preloaded values to provide quick location prediction of the given memory address. Such location prediction modules may provide predicted locations in a few clock cycles. In some examples, the location prediction modules may utilize hardware tables and associated logic to reduce the time to identify a pattern in the memory address distribution table 223 to predict the location of the given memory address. The memory address distribution tables 300 and 400 are shown here for illustrative purposes only. A variety of other techniques may be utilized to generate memory address distribution tables for prediction of locations of one or more memory addresses.

Figure 5:
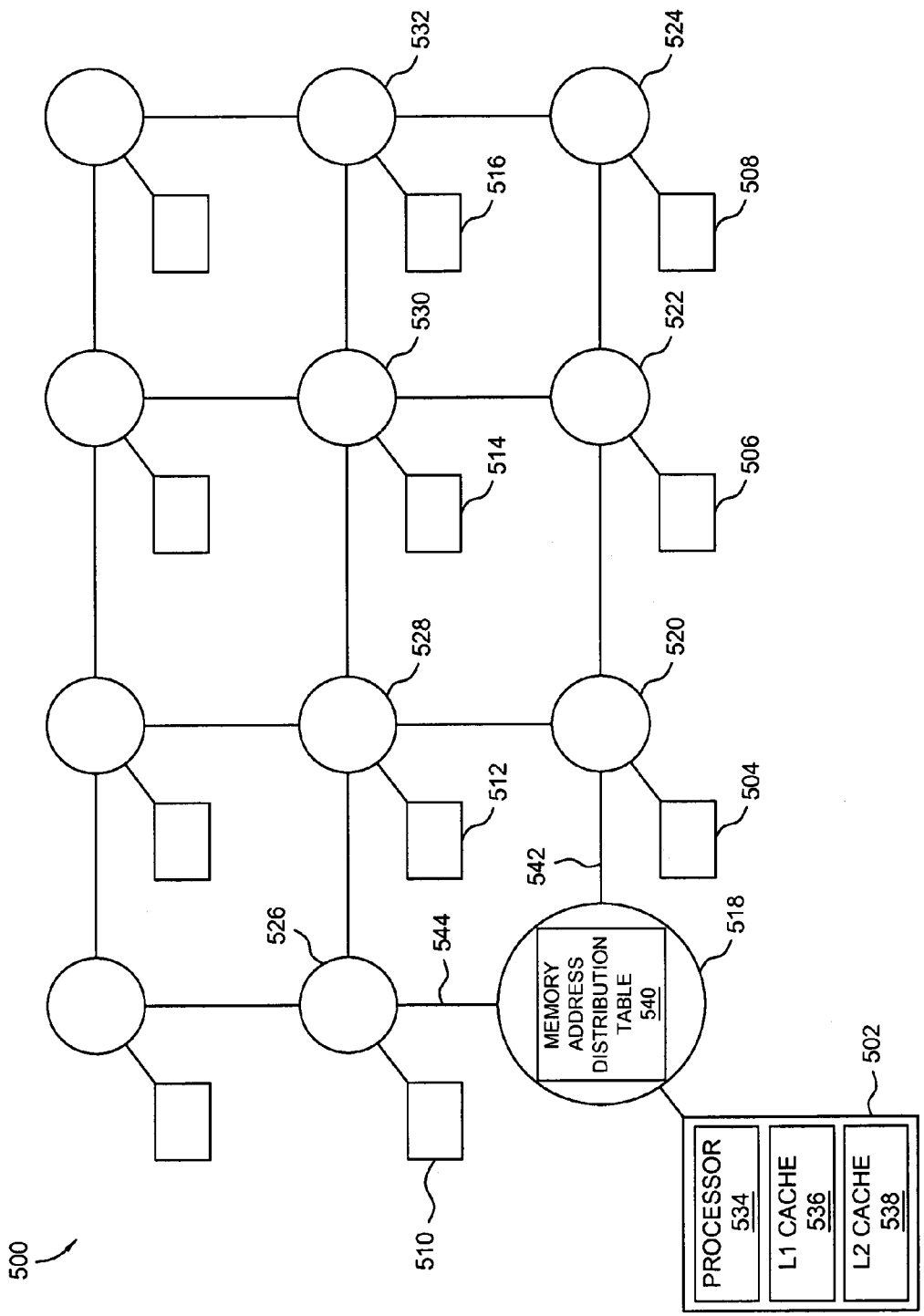
FIG. 5 is a schematic diagram illustrating functional components of another example multi-core processor device.

FIG. 5 is a schematic diagram illustrating another example multi-core processor device 500 arranged in accordance with at least some embodiments of the present disclosure. The multi-core processor device 500 may include a plurality of cores such as represented by reference numerals 502, 504, 506, 508, 510, 512, 514 and 516. The multi-core processor device 500 may also include a plurality of routers such as represented by reference numerals 518, 520, 522, 524, 526, 528, 530 and 532 coupled to their corresponding cores 502, 504, 506, 508, 510, 512, 514 and 516. The routers 518, 520, 522, 524, 526, 528, 530 and 532 can be configured to facilitate communication between the plurality of cores 502, 504, 506, 508, 510, 512, 514 and 516.

Here, the routers 518, 520, 522, 524, 526, 528, 530 and 532 are arranged in a matrix form and form a mesh network. It should be noted that the above configuration of the routers and the cores is for illustrative purposes only. A variety of other arrangements of the routers and the cores may be envisaged. For example, one router may be coupled to multiple cores, or multiple routers may be coupled to one core.

In this example embodiment, each core (e.g., core 502) may include a processor 534 and may be associated with one or more on-chip caches such as a L1 cache 536 and a L2 cache 538. In some examples, additional on-chip shared caches may be present. The present technique may be applicable to a variety of multi-core processors with different configurations of local and shared caches to store data. Moreover, each of the routers (e.g., router 518) may include a memory address distribution table (or a subset thereof) such as represented by reference numeral 540 of memory addresses stored by the plurality of on-chip caches of one or more of the cores (such as the core 504 and 510) coupled to output connection paths (such as connection path 542 and 544) of the corresponding router 518. The memory address distribution table such as table 540 may be maintained by each router (e.g., router 518) and may be utilized to predict a location of a given memory address.

In some example embodiments, the memory address distribution table 540 may include probabilistic information about memory addresses stored on one or more of the cores. The details of generation of the memory address distribution table 540 will be described in a greater detail with reference to FIG. 6. In one example, the memory address distribution table 540 may include a Bloom filter that functions as a data structure to indicate whether the given memory address is stored on one or more of the cores (such as cores 504 and 510) coupled to one or more output connection paths (such as connection paths 542 and 544) of the corresponding router (e.g., router 518). In some examples, additional hardware logic may be utilized to perform updates to the Bloom filters as the content of the associated caches is updated. In one embodiment, the additional hardware logic may reside in each of the routers. In some other examples, the additional hardware logic may reside in the core coupled to each router. In some examples, a thread can be executed on a core coupled to each router to update the Bloom filter. Thus, each of the routers 518, 520, 522, 524, 526, 528, 530 and 532 maintains information at each of the output connection paths regarding the memory addresses stored on cores reachable from the respective output connection path.

During operation, a request may be sent to the cores that may be indicated as probable locations of the given memory address and a response from one of the cores may be received. The given memory address may then be accessed from the respective cores.

In some example embodiments, each of the plurality of routers (such as router 518) can be configured to transmit the memory address distribution table (e.g., table 540) to other routers (such as routers 520 and 526) associated with the cores (such as cores 504 and 510) coupled to the output connection paths (e.g., connection paths 542 and 544) of the corresponding router (router 518). The memory address distribution table 540 linked to each of the routers can be dynamically updated and can be utilized for prediction of location of accessed memory addresses.

As discussed above, each router can maintain a Bloom filter for cached contents of the associated core. As information is updated for each router, it may be propagated to other proximate routers. Each of the routers can maintain a portion of the memory distribution table with information regarding the cores proximate to the corresponding router and with each update to such information, the updates can be propagated to the proximate cores. In some example embodiments, each of the plurality of routers can maintain multiple memory address distribution tables with different accuracy levels and such tables may be used for prediction of a given memory address.

Generation of memory distribution table: The example embodiments illustrated above describe a multi-core processor device having a plurality of routers. Each router can maintain a memory distribution table for prediction of a cached location of a given memory address. The memory distribution table may be generated by monitoring routing of inputs and outputs through each router of the multi-core processor device.

Figure 6:
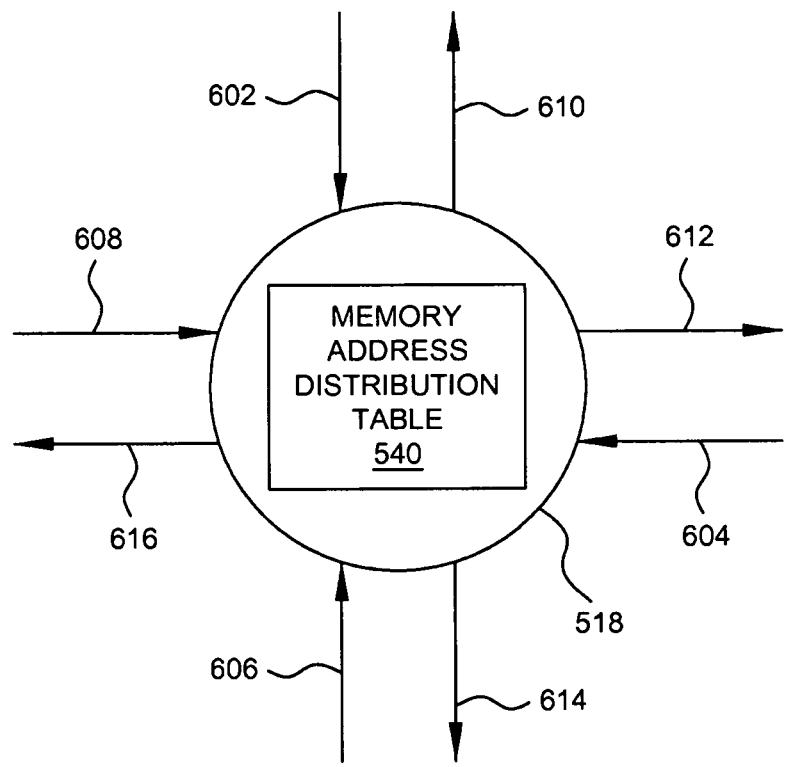
FIG. 6 illustrates an example router of the multi-core processor device of FIG. 5, arranged in accordance with at least some embodiments described herein.

FIG. 6 illustrates an example router of the multi-core processor device 500 of FIG. 5, arranged in accordance with at least some embodiments described herein. As illustrated, a plurality of input requests (such as represented by reference numerals 602, 604, 606 and 608) and a plurality of output requests such as represented by reference numerals 610, 612, 614 and 616 may be routed through the router 518. Such routing of the input requests 602, 604, 606 and 608 and the output requests 610, 612, 614 and 616 may be monitored and utilized to generate the memory address distribution table 540 of the router 518:

The input requests 602, 604, 606 and 608 and the output requests 610, 612, 614 and 616 may be analyzed to monitor the core identification numbers of the cores that send and/or receive (i.e., communicate) data through the router 518. The on-chip locations of data transferred through the router 518 may be utilized to generate the memory address distribution table of the corresponding router. In various example embodiments, the memory address distribution table can include a probability distribution. In some example embodiments, the memory address distribution table can include a Bloom filter.

As described above, each of the plurality of routers (such as router 518) can be configured to transmit the memory address distribution table (e.g., table 540) to other routers (such as routers 520 and 526) associated with the cores (such as cores 504 and 510) coupled to the output connection paths (e.g., connection paths 542 and 544) of the corresponding router (router 518). Such updated memory address distribution table may then be used to predict a location of a given memory address.

The example techniques described herein may be used for locating cached data in a multi-core processor device. The example techniques may also be used for locating cached data when a single core of a multi-core processor device is turned on, but the caches of the other cores are active. More generally, the example techniques may be used in a variety of applications where data accessed by a thread executing on a processor may be cached in one of numerous caches of the multi-core processor device and where it is inefficient to maintain an exact mapping of memory addresses to their cache locations. In some examples, the probabilistic techniques described above may be implemented along with standard coherence logic to locate cached data in cores of the multi-core processor device.

In certain embodiments, additional techniques may be utilized to predict the location of a given memory address. For example, a request for the given memory address may be communicated to each of the cores to locate the core with the given memory address. In other examples, the request for the given memory address may be transmitted to a central directory and may be further directed to the appropriate destination core with the given memory address.

The example methods and systems described above provide a probabilistic framework for prediction of location of cached data in multi-core processors and in other general parallel or distributed computing systems. The present techniques are used to predict the location of a given memory address using computations based on memory address distribution of the locations of memory address stored on cores of a multi-core processor. Such prediction may be carried out without maintaining centralized directories with substantial size that may grow in proportion to the number of cores and memory size of the multi-core processor.

For example, for a multi-core processor device having N number of cores, a given memory address may be present in the caches of any or in each of the N cores. If at least one of the on-chip caches includes about M memory locations, a memory directory may require about M×N bits to maintain mappings of memory locations to all their cached locations for a bit-mask data structure. Moreover, to provide each of the N cores with a copy of the mapping directory about (M×N)×N bits may be utilized. As can be seen, with an increase in the number of cores the memory requirements to maintain such mappings may become substantially large. The present techniques, in turn, may utilize probabilistic techniques to predict the locations of a given memory address without the need of centralized and/or local directories. Moreover, the present solution may be scalable for a large number of cores and may result in reduced look-up time for data in multi-core processors.

FIG. 7 is a block diagram illustrating an example computing device 700 that is arranged for managing cached memory addresses in a multi-core processor in accordance with at least some embodiments of the present disclosure. In a very basic configuration 702, the computing device 700 typically includes one or more processors 704 and a system memory 706. A memory bus 708 may be used for communicating between processor 704 and system memory 706. The processor 704 includes a multi-core processor.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, two or more processor cores 714, and registers 716. An example processor core 714 may include an arithmetic logic unit (ALU), a floating point unit (FPU), a digital signal processor core (DSP Core), or any combination thereof. An example memory controller 718 may also be used with processor 704, or in some implementations memory controller 718 may be an internal part of processor 704. The processor 704 may include a location prediction module such as described above to facilitate prediction a location of a given memory address based upon a memory address distribution table of memory addresses stored by the on-chip caches of one or more of the processor cores 714.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. In some embodiments, application 722 may be arranged to operate with program data 724 on operating system 720. This described basic configuration 702 is illustrated in FIG. 7 by those components within the inner dashed line. Application 722 may include algorithm for predicting location of a given memory address. Program data 724 may include a memory address distribution table of a location of one or more memory addresses cached by one or more of the processor cores.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752.

Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method to manage cached memory addresses in a multi-core processor device, the method comprising:
monitoring communication between a memory and a first cache, wherein the first cache is associated with a first core, the first core is among two or more cores in the multi-core processor device, and the first cache is among two or more caches in the multi-core processor device;
monitoring communication between the memory and a second cache, wherein the second cache is associated with a second core, wherein the second cache is among the two or more caches, and the second core is among the two or more cores;
identifying one or more memory addresses cached by the first core based on the monitored communications;
generating a probabilistic memory address distribution table, wherein the probabilistic memory address distribution table indicates a probability that the one or more memory addresses are stored in the two or more caches; and
predicting a location of a given memory address based upon a probability that the given memory address is stored in the two or more caches, wherein the probability that the given memory address is stored in the two or more caches is indicated by the probabilistic memory address distribution table.

2. The method of claim 1, wherein monitoring communication comprises analyzing one or more messages communicated between the memory and the first and second caches.

3. The method of claim 1, wherein predicting the location of the given memory address comprises:
storing the probabilistic memory address distribution table in a memory address summarizer that is associated with the two or more caches;
accessing the probabilistic memory address distribution table by of two or more cores when the given memory address is accessed; and
identifying a specific core that stores the given memory address in a corresponding cache by utilizing the probabilistic memory address distribution table.

4. The method of claim 3, wherein accessing the probabilistic memory address distribution table comprises sending the probabilistic memory address distribution table to the two or more cores.

5. The method of claim 1, wherein generating the probabilistic memory address distribution comprises:
analyzing the identified one or more memory addresses to identify a bit pattern of the one or more memory addresses; and
storing the bit pattern.

6. The method of claim 1, wherein generating the probabilistic memory address distribution table comprises utilizing a Bloom filter to index the identified one or more memory addresses in the probabilistic memory address distribution table.

7. The method of claim 1, wherein predicting the location of the given memory address comprises:
comparing the given memory address with the probabilistic memory address distribution table; and
identifying a specific cache based upon the comparison, wherein the specific cache is associated with a specific core, and the specific cache is identified as a predicted location of the given memory address.

8. The method of claim 7, further comprising estimating the probability that the given memory address is stored in the specific cache associated with the specific core.

9. The method of claim 8, further comprising locating the given memory address in the specific cache based upon the estimated probability that the given memory address is stored in the specific cache.

10. The method of claim 1, wherein generating the probabilistic memory address distribution table comprises storing the probabilistic memory address distribution table at a router, wherein the router is configured to facilitate communications among the two or more cores.

11. The method of claim 10, wherein generating the probabilistic memory address distribution table comprises monitoring data transferred among two or more routers associated with the two or more cores, wherein the two or more routers include the router.

12. A multi-core processor device, comprising:
a first core associated with a first cache, wherein the first core includes a first location prediction module, the first core is among two or more cores in the multi-core processor device that are configured to be in communication with a memory, the first cache is among two or more caches in the multi-core processor device, and the two or more caches corresponds to the two or more cores;

a second core associated with a second cache, wherein the second core includes a second location prediction module, the second core is among the two or more cores in the multi-core processor device, and the second cache is among the two or more caches in the multi-core processor device; and a memory address summarizer coupled to the first and second cores, and configured to:
monitor communication between the one or more on chip caches and a memory and the first cache;
monitor communication between the memory and the second cache;
based on the monitored communications, generate a probabilistic memory address distribution table by use of one or more memory addresses cached in at least one of the two or more caches, wherein the probabilistic memory address distribution table indicates a probability that the one or more memory addresses are stored in the at least one of the two or more caches, wherein each of the first and second location prediction modules is configured to predict a location of a given memory address based upon a probability that the given memory address is stored in the two or more caches, wherein the probability that the given memory address is stored in the two or more caches is indicated by the probabilistic memory address distribution table.

13. The multi-core processor device of claim 12, wherein each of the first and second cores comprises a part of one of a general purpose processor, an application specific processor, or an embedded processor.

14. The multi-core processor device of claim 12, wherein the memory address summarizer is configured to generate the probability distribution table by use of memory addresses of data transferred from the memory to each of the two or more caches.

15. The multi-core processor device of claim 14, wherein the memory address summarizer is configured to analyze a bit pattern of one or more of the memory addresses to generate the probability distribution table.

16. The multi-core processor device of claim 15, further comprising an interconnection network coupled to the memory address summarizer and to the two or more cores, and the interconnection network is configured to transmit the probability distribution table from the memory address summarizer to the first and second location prediction modules.

17. The multi-core processor device of claim 16, wherein each of the first and second location prediction modules is configured to:
compare the given memory address with the probability distribution table; and
identify a specific cache based on the comparison, wherein the specific cache is associated with a specific core, and the specific cache is identified as a predicted location of the given memory address.

18. The multi-core processor device of claim 17, wherein each of the first and second location prediction modules is configured to estimate the probability that the given memory address is stored in the specific cache associated with the specific core.

19. A multi-core processor device, comprising:
a first set of cores associated with a first set of caches, wherein the first set of cores is among two or more cores in the multi-core processor device, the first set of caches is among two or more caches in the multi-core processor device, and the two or more caches corresponds to the two or more cores;

a second set of cores associated with a second set of caches, wherein the second set of cores is among the two or more cores in the multi-core processor device, and the second set of caches is among the two or more caches in the multi-core processor device;

a router coupled to the first set of cores, wherein the router is configured to facilitate communication among the first set of cores, the router includes a probabilistic memory address distribution table that indicates a probability that the one or more memory addresses are stored by at least one of the two or more caches, wherein the probabilistic memory address distribution table is used by the first and second sets of cores to predict a location of a given memory address based upon a probability that the given memory address is stored in the two or more caches, and wherein the probability that the given memory address is stored in the two or more caches is indicated by the probabilistic memory address distribution table.

20. The multi-core processor device of claim 19, wherein at least two cores are associated with a shared cache from among the two or more caches.

21. The multi-core processor device of claim 19, wherein the router includes a first router, and wherein the first router is further configured to transmit the probabilistic memory address distribution table to a second router coupled to the second set of cores.

22. The multi-core processor device of claim 21, wherein the probabilistic memory address distribution table comprises a Bloom filter, and wherein the first router is configured to indicate whether the given memory address is stored in the second set of caches.

23. A method to manage cached memory addresses in a multi-core processor device, the method comprising:
generating a probabilistic memory address distribution table that indicates a probability that one or more memory addresses are cached in at least one of two or more caches of the multi-core processor device, wherein the two or more caches are associated with two or more cores;
identifying a memory address, to be accessed during execution of one or more threads by a particular core among the two or more cores of the multi-core processor device; and
predicting a location of the identified memory address on one or more on chip caches associated with cores different from the particular core based upon a probability that the identified memory address is cached in the two or more caches, wherein the probability that the identified memory address is cached in the two or more caches is indicated by the probabilistic memory address distribution table; and
wherein data associated with the identified memory address is to be accessed from the predicted location during the execution.

24. The method of claim 23, further comprising:
analyzing the one or more memory addresses to identify a bit pattern of the identified memory addresses; and
utilizing the bit pattern to generate the probabilistic memory address distribution table.

25. The method of claim 23, wherein predicting the location of the identified memory address comprises:
comparing the identified memory address with the probabilistic memory address distribution table; and identifying a specific cache based on the comparison, wherein the specific cache is identified as the predicted location of the identified memory address.

26. A multi-core processor device, comprising:
a plurality of cores, each core being associated with one or more of a plurality of on-chip caches; and
a plurality of routers coupled to the plurality of cores and configured to facilitate communications between the plurality of cores, wherein each of the plurality of routers comprises a probabilistic memory address distribution table of memory addresses stored by the one or more of the plurality of on-chip caches of an associated one or more of the cores, the associated one or more of the cores being coupled to output connection paths of a corresponding router,
wherein the probabilistic memory address distribution table is usable to predict a location of a given memory address based upon a probabilistic memory address distribution, and
wherein each of the plurality of routers is further configured to transmit the probabilistic memory address distribution table to other routers coupled to the associated one or more cores coupled to the output connection paths of the corresponding router.

27. A method to manage cached memory addresses in a multi-core processor device, the method comprising:
monitoring communication between one or more of a plurality of caches of the multi-core processor device and a memory;
identifying one or more memory addresses cached by each of a plurality of cores of the multi-core processor device based on the monitored communications;
generating a probabilistic memory address distribution table of a location of the one or more memory addresses cached by each of the plurality of cores; and
predicting a location of a given memory address based upon the probabilistic memory address distribution table,
wherein predicting the location of the given memory address comprises accessing the probabilistic memory address distribution table by one or more of the plurality of cores when the given memory address is accessed, and
wherein accessing the probabilistic memory address distribution table comprises sending the probabilistic memory address distribution table to the one or more of the plurality of cores.

28. A multi-core processor device, comprising:
a plurality of cores, each of the cores being associated with one or more on-chip caches and including a location prediction module;
a memory address summarizer configured to monitor communication between the one or more on-chip caches and a memory and configured to generate a probabilistic memory address distribution table by use of a plurality of memory addresses cached in the one or more on-chip caches, wherein the location prediction module is configured to predict a location of a given memory address based upon the probabilistic memory address distribution table; and
an interconnection network coupled to the memory address summarizer and to one or more of the plurality of cores, and configured to transmit the probability distribution table from the memory address summarizer to the location prediction module of one or more of the plurality of cores.

* * * * *